April 18, 1967  G. R. FERGUSON ETAL  3,314,696
QUICK CONNECT COUPLING
Filed Feb. 11, 1964  2 Sheets-Sheet 2
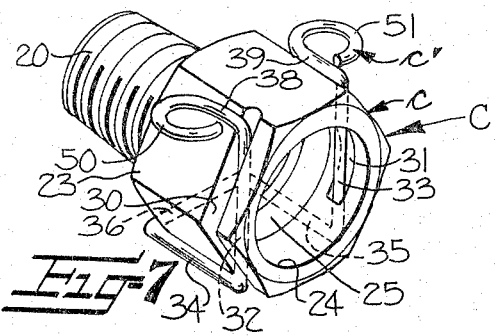
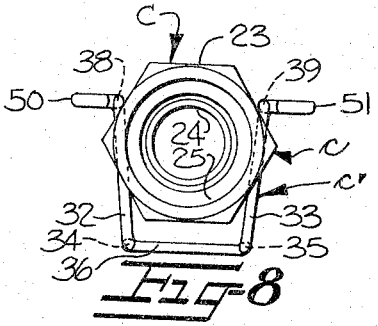
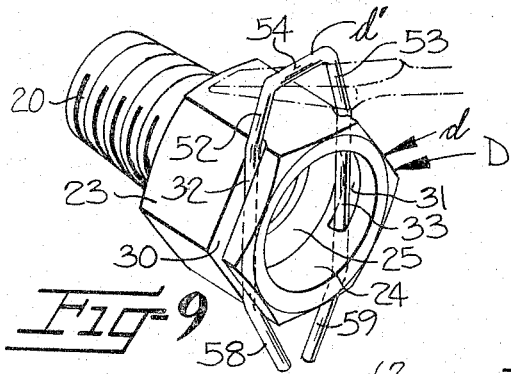
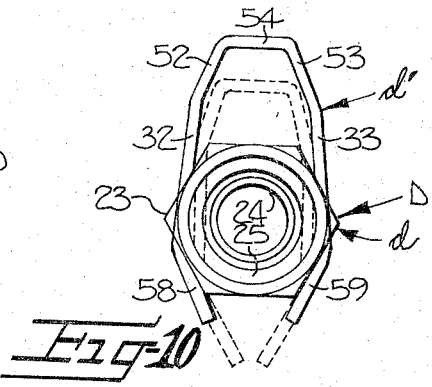
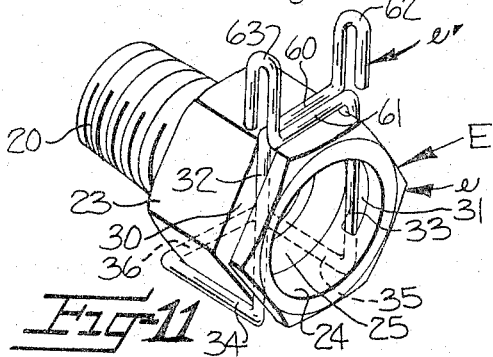
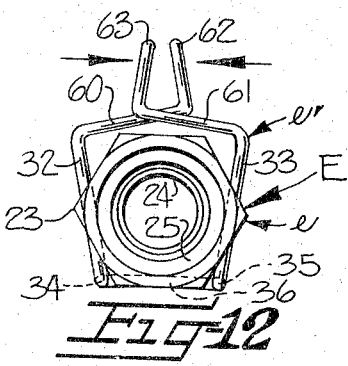
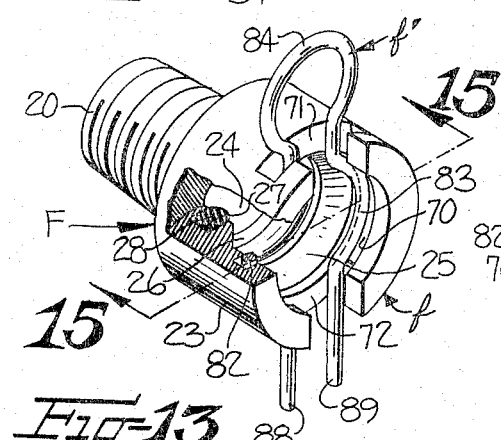
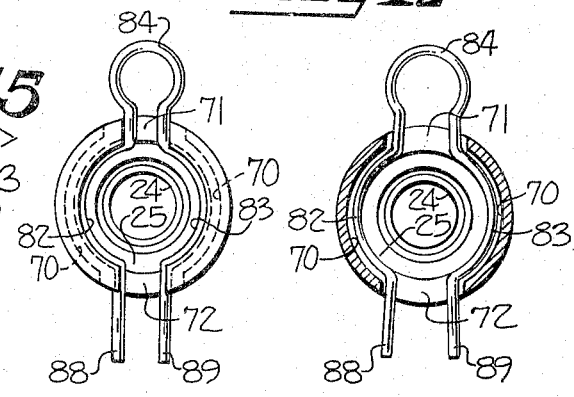

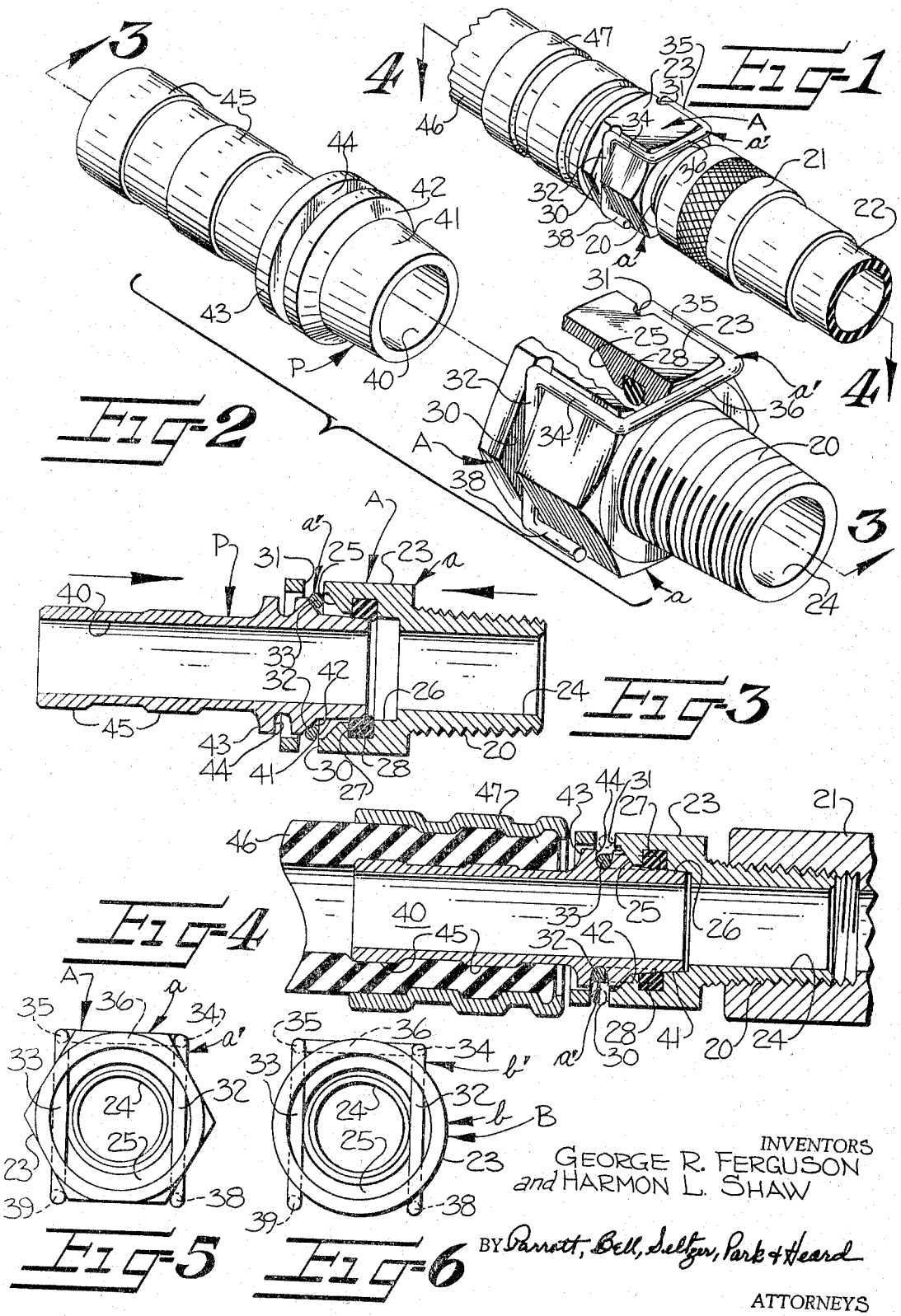

United States Patent Office 3,314,696
Patented Apr. 18, 1967

3,314,696
QUICK CONNECT COUPLING
George R. Ferguson and Harmon L. Shaw, Charlotte, N.C., assignors to Perfecting Service Company, Charlotte, N.C., a corporation of North Carolina
Filed Feb. 11, 1964, Ser. No. 344,111
3 Claims. (Cl. 285—174)

This invention relates to an improved quick connect coupling of the type which includes a tubular receptacle and a tubular plug adapted to be quickly interlocked in the tubular receptacle without requiring the use of any tools.

Heretofore, there have been several types of quick connect couplings in use in a wide variety of applications, however, these prior couplings have included complicated elements for locking the parts together. An axially movable and/or rotatable movable locking sleeve is usually provided to control the radial movement of the detents that move inwardly to engage a locking groove on the plug. The manufacture and assembly of the locking sleeves make this type of coupling too expensive for many installations, where a quick connect coupling might be desirable.

It is a primary object of the present invention to provide a quick connect coupling of the type described which may be economically mass produced on conventional machine shop equipment and easily assembled.

It is another object of the present invention to produce an inexpensive quick connect coupling of the type described which includes a relatively simple locking element in the form of a substantially U-shaped retaining spring clip that is carried by the receptacle and is adapted to releasably interlock with the plug member when it is pushed into sealing engagement within the receptacle.

It is a more specific object of the present invention to provide a quick connect coupling of the type described in which the retaining spring clip is provided with opposed legs that straddle the plug when it is moved into the receptacle and resiliently snap into engagement with a locking groove in the plug, and wherein the free ends of the legs of the retaining spring clip are disposed externally of the receptacle so that the legs may be spread apart to release the plug from the receptacle.

It is another specific object of the present invention to provide a quick connect coupling of the type described in which portions of the outer surface of the receptacle act as cams on the free ends of the legs of the retaining spring clip to automatically spread the medial portions of the legs apart and release the plug when movement is imparted to the retaining spring clip in a direction transverse to the receptacle.

It is still another specific object of the present invention to provide a quick connect coupling of the type described in which the legs of the retaining spring clip are connected together by a resilient bridging portion that is disposed externally of the receptacle and has portions which extend laterally and transversely of the receptacle to enhance the spring and strength of the retaining spring clip.

Some of the objects of the invention having been stated, other objects will appear as the description proceeds, when taken in connection with the accompanying drawings, in which—

FIGURE 1 is an isometric view of a preferred form of the quick connect coupling with the plug and receptacle interlocked together to connect the ends of a pair of fluid conducting pipes;

FIGURE 2 is an exploded isometric view of the plug and receptacle of the quick connect coupling in separated condition, with the ends of the corresponding fluid conducting pipes removed therefrom and with a portion of the receptacle being broken away;

FIGURE 3 is a longitudinal horizontal sectional view taken substantially along the line 3—3 in FIGURE 2 and showing the position of the parts as the plug is being inserted into the receptacle;

FIGURE 4 is a longitudinal horizontal sectional view, at an enlarged scale, and being taken substantially along the line 4—4 in FIGURE 1;

FIGURE 5 is an elevational view looking at the free end of the receptacle and illustrating the manner in which the medial portions of the legs of the retaining spring clip are normally positioned within the axial bore that receives the plug;

FIGURE 6 is a view similar to FIGURE 5 except showing a modified form of receptacle in which the outer periphery is circular;

FIGURE 7 is an isometric view looking at the free end of another modified form of receptacle;

FIGURE 8 is an end elevation of the form of receptacle shown in FIGURE 7 and showing the legs of the retaining spring clip spread apart to release the plug which is normally positioned wtihin the receptacle;

FIGURE 9 is a view similar to FIGURE 7 and showing still another modified form of receptacle;

FIGURE 10 is an end elevation of the receptacle shown in FIGURE 9 and showing the legs of the retaining spring clip spread apart in solid lines, the retaining spring clip being shown in dotted lines in the position it normally occupies;

FIGURE 11 is an isometric view of yet another modified form of receptacle;

FIGURE 12 is an end elevation of the receptacle shown in FIGURE 11 with the legs of the retaining spring clip spread apart to release the plug;

FIGURE 13 is an isometric view of the final modified form of receptacle with portions broken away for purposes of clarity;

FIGURE 14 is an end elevation of FIGURE 13 and showing the retaining spring clip in its normal position with medial portions of the opposed legs positioned within the axial bore of the receptacle; and FIGURE 15 is a vertical sectional view taken substantially along the line 15—15 in FIGURE 13 and illustrating the legs of the retaining spring clip spread apart.

Referring particularly to the first form of coupling shown in FIGURES 1–5, it will be noted that the coupling includes a male member or tubular plug, broadly referred to at P, and a female member of tubular receptacle, broadly referred at A. The tubular receptacle A includes a socket *a* and a locking element in the form of a retaining spring clip *a'* that is carried by the socket *a*.

The socket *a* has a reduced outer end that is externally threaded, as at 20, for reception of an internally threaded pipe connector 21 which is in turn connected to one end of a fluid conducting pipe 22 (FIGURE 1). The free or inner end of the socket *a* has an enlarged portion 23 with its outer periphery flattened on six sides so that it is hexagonal, as best seen in FIGURE 5. An axial bore 24 extends through the socket *a* and includes a conical surface 25 tapering inwardly toward the longitudinal axis of the socket *a* in a direction away from the inner end. A second conical surface 26 extends from the conical surface 25 and tapers inwardly toward the outer end of the socket *a* at a much shallower angle than the conical surface 25. A circumferentially extending groove 27 is provided in a medial portion of the conical surface 26 for reception of a sealing O-ring 28. Diametrically opposed slots 30 and 31 are cut in opposite sides of the enlarged portion 23 of the socket *a* and their medial portions communicate with the axial bore 24.

The locking element $a'$ is preferably formed of springy material which is round in cross-section and includes a pair of opposed legs 32 and 33 (FIGURE 5) which are positioned in the respective slots 30, 31 of the socket $a$. The upper ends of the legs 32, 33 are connected together by a resilient bridging portion that is disposed externally of the socket $a$ and includes parallel longitudinally extending side members 34, 35 which are integral with the upper ends of the respective legs 32, 33 and connected together by a transverse member 36. The lower ends of the legs 32, 33 are provided with respective right angular foot portions 38 and 39 which are also disposed externally of the socket $a$ and normally in engagement with the outwardly diverging faces of the enlarged portion 23. The bridging portion, including the members 34, 35 and 36, normally resiliently maintain the medial portions of the legs 32, 33 inwardly against the bottoms of the slots 30, 31 so that medial portions of the legs 32, 33 are normally positioned within and on opposed sides of the axial bore 24 in the socket $a$, as is best shown in FIGURE 5.

The plug P also has an axially extending central bore 40 that extends from one end to the other and the free or inner end of the plug is reduced in diameter and has a conical sealing surface 41 which corresponds to the conical surface 26 on the interior of the socket $a$ and which tapers outwardly from the axis at a slight angle toward the outer end of the plug P. A conical cam surface 42 extends from the sealing surface 41 and flares outwardly at an angle corresponding to the angle of the conical surface 25 of the socket $a$. The outermost edge of the cam surface 42 terminates at the inner edge of an enlarged locking portion 43 of the plug P. The enlarged portion 43 is provided with a circumferentially extending external locking groove 44, the inner depth of which corresponds to the distance between the bottoms of the corresponding slots 30, 31 in the socket $a$. The outermost end of the plug P is provided with a plurality of circumferential ribs 45 which are provided to facilitate attachment of one end of a fluid conducting pipe 46.

The end of the fluid conducting pipe 40 may be inserted onto the reduced outer end of the plug P, as shown in FIGURE 4, and a suitable ferrule 47 may then be crimped in position over the end of the pipe 46 to attach the pipe to the outer end of the plug P. Although a particular means is shown for connecting the fluid conducting pipes 22 and 46 to opposed ends of the respective receptacle A and plug P, it is to be understood that other suitable means may be employed to attach the fluid conducting pipes to the plug and receptacle.

When the inner reduced end of the plug P is inserted in the inner end of the bore 24 of the socket $a$, as shown in FIGURE 3, the medial portions of the legs 32, 33 of the locking element $a'$ are engaged and moved apart by the cam surface 42 on the plug P while they are moved outwardly in their respective slots 30, 31 in the socket $a$. At the same time, the sealing surface 41 on the plug P engages the sealing O-ring 28 in the socket $a$. When the plug P is moved inwardly a sufficient distance to aline the locking groove 44 with the slots 30, 31, as shown in FIGURE 4, the medial portions of the legs 32, 33 of the locking element $a'$ snap into position into the locking groove 44 and thereby lock the plug P in the receptacle A.

Thus, the medial portions of the legs 32, 33 in the locking groove 44 prevent axial movement of the plug P and receptacle A relative to each other but permit rotational movement therebetween. When it is necessary to separate the plug P and the recepacle A, the legs 32, 33 may be spread apart, to the dotted line position shown in FIGURE 4, the medial portions of the legs 32, 33 of the withdrawn from the receptacle A. While the legs may be spread apart by moving the foot portions 38, 39 away from each other, it is preferred that a tool, such as a screwdriver, be used to raise the bridging portion of the retaining spring clip $a'$ above the positions shown in FIGURES 1, 2 and 5. When the retaining spring clip or locking element $a'$ is moved transversely of the socket $a$, the foot portions 38, 39 will ride up on the oppositely inclined hexagonal faces of the enlarged portion 23 and be separated. This will automatically spread the medial portions of the legs 32, 33 apart so that they move out of the locking groove 44 in the plug P, to release the same for removal from the receptacle A.

The modified form of receptacle B, shown in FIGURE 6, includes a socket $b$, and a locking element $b'$. This receptacle B is adapted to operate with a tubular plug identical to the plug P shown in FIGURES 1–4. The locking element $b'$ is identical to the locking element $a'$ shown in FIGURES 1–5 and therefore corresponding parts will bear like reference characters. The socket $b$ is also identical to the socket $a$ shown in FIGURES 1–5, except that in the socket $b$, the outer periphery of the enlarged portion 23 is circular and not hexagonal. Therefore, corresponding parts will bear like reference characters. The circular outer periphery of the enlarged portion 23 of the socket $b$ will still force the foot portions 38, 39 of the locking element $b'$ (FIGURE 6) apart with upward movement of element $b'$. This will result in a spreading of the medial portions of the legs 32, 33 to free the plug from locked connection with the socket $b$.

A third modified form of receptacle, broadly indicated at C, is shown in FIGURES 7 and 8. This receptacle C includes a socket, broadly indicated at $c$, and a retaining spring clip locking element, broadly indicated at $c'$. The socket $c$ is identical to the first form of socket $a$, shown in FIGURES 1–5, and therefore corresponding parts will bear like reference characters. The locking element $c'$ is also similar to the locking element $a'$ and includes opposed leg portions 32, 33, parallel rearwardly extending bridging portions 34, 35, a transverse portion 36, and rearwardly extending foot portions 38, 39. However, in this locking element $c'$, the outer ends of the foot portions 38, 39 are bent in a circle to form respective depressing elements 50 and 51.

In order to spread apart the medial portions of the legs 32, 33, as shown in FIGURE 8, so that they are not disposed within the bore 24 in the socket $c$, the depressing elements 50, 51 may be utilized to apply downward pressure on the locking element $c'$. When downward pressure is applied on the circular elements 50, 51 (FIGURE 8), the foot portions 38, 39 will be moved apart as they move down the outwardly inclined faces of the hexagonal periphery of the socket $c$. It is to be understood that the leg portions 32, 33 could also be spread apart sufficiently to release the plug P by manually separating the circular depressing portions 50, 51 without moving the locking element $c'$ transversely of the socket $c$.

In the first three forms of receptacle (FIGURES 1–5, 6 and 7, 9), the bridging portion of the locking elements, including the portions 34, 35 and 36, does not protrude outwardly beyond the periphery of the enlarged portion of socket. Also, the other ends of the locking elements do not extend out far enough to be accidently caught on any adjacent structure.

A fourth modified form of receptacle is shown in FIGURES 9 and 10 and indicated broadly at D. The receptacle D includes a socket, broadly indicated at $d$, and a locking element, broadly indicated at $d'$. The socket $d$ is identical to the socket $a$ and $c$ and therefore, corresponding parts will bear like reference characters.

The locking element $d'$ contains some parts that are the same as corresponding parts of the locking elements $a'$ and $c'$ and some parts that are different. For example, the locking element $d'$ has a pair of opposed legs 32 and 33 which are disposed in the slots 30 and 31 of the socket $d$. The upper ends of the legs 32, 33 are connected together by a resilient bridging portion including inwardly inclined portions 52, 53 and their upper ends are connected together by a transverse portion 54. The lower ends of the legs 32, 33 extend outwardly beyond the lower portion of the socket *d* and are bent inwardly at acute angles toward each other to form cam portions 58, 59.

The socket *d* and the receptacle D are adapted to receive and interlock with a plug identical with the plug P shown in FIGURES 1–4. When the plug is pushed into the receptacle D, the legs 32, 33 of the locking element *d* are spread apart and snap into engagement with the locking groove of the plug to interlock the plug and the receptacle A. In order to separate the plug and the receptacle D, any suitable tool, such as the point of a screwdriver, shown in dash-dot lines in FIGURE 9, may be inserted beneath the connecting portion 54 of the locking element *d'* and raised to move the same transversely of the socket *d* and to the solid line position shown in FIGURE 10. With transverse movement, the camming portions 58 and 59 engage the outwardly inclined portions of the hexagonal outer periphery of the enlarged portion 23 of the socket *d* to thereby spread the leg portions 32, 33 apart a sufficient distance that they move out of engagement with the locking groove in the plug to release the same.

A fifth modified form of receptacle, broadly indicated at E, is shown in FIGURES 11 and 12. The receptacle E includes a socket, broadly indicated at *e*, and a locking element, broadly indicated at *e'*. The socket *e* is identical to the sockets *a*, *c* and *d* and therefore corresponding parts will bear like reference characters.

In this receptacle E, the locking element *e'* has been modified slightly, however, it still includes the opposed legs 32, 33 which are positioned for movement toward and away from each other in the slots 30, 32 of the socket *e*, the rearwardly extending parallel leg portions 34, 35 and the transverse portion 36, which collectively make up the resilient bridging portion. The opposite ends of the legs 32, 33 are provided with respective transversely bent portions 60 and 61 which are normally in the side-by-side position shown in FIGURE 11. Substantially inverted U-shaped operating ears 62, 63 are formed integral with the portions 60, 61 and extend upwardly therefrom.

The plug P can be inserted in the receptacle E and the legs 32, 33 will be automatically spread apart and then snap into locking engagement in the groove 43 of the plug when the plug has been moved inwardly a sufficient distance to thereby interlock the plug P and the receptacle E together. The plug P may be easily removed from the receptacle E by moving the ears 62, 63 of the locking element *e'* toward each other, as shown in FIGURE 12 to thereby spread apart the legs 32, 33 a sufficient distance that they move out of the groove 43 in the plug P to release the same.

The last modified form of socket is broadly indicated at F and shown in FIGURES 13–15. The receptacle F includes a socket, broadly indicated at *f*, and a locking element, broadly indicated at *f'*. In the form of receptacle F, shown in FIGURES 13–15, both the socket *f* and the locking element *f'* have been modified. The socket *f* includes the threaded end portion 20 and enlarged free end portion 23 which has a smooth circular outer periphery. The socket *f* also has the axially extending bore 24 therein, the inwardly tapering conical surface 25 (FIGURE 13), and the shallow tapered conical surface 26. An internal circumferential groove 27 is provided in a medial portion of the conical surface 26 for reception of the sealing O-ring 28. However, the opposed slots are not formed in the exterior portion of the enlarged portion 23 of the socket *f*. These slots have been replaced by an internal circumferential locking element retaining groove 70 which is spaced inwardly from the inner end of the socket *f*. Opposed upper and lower T-shaped keyhole slots 71 and 72 are cut inwardly from the inner end of the socket *f*. As is clearly shown in FIGURE 13, the transversely extending portions of the T-shaped slots 71 and 72 communicate with the locking element retaining groove 70 in the socket *f*.

The locking element *f'* includes opposed leg portions 82 and 83 which are curved to generally conform to the inner periphery of the groove 70 and their medial portions are positioned in the groove 70. The upper ends of the opposed legs 82, 83 are connected together by a circular bridging portion 84 which extends through the T-shaped slot 71 and is disposed exteriorly of the socket *f*. The bridging portion 84 has sufficient spring to resiliently maintain the legs 82 and 83 in the position shown in FIGURE 14. The lower ends of the legs 82, 83 extend outwardly beyond the socket and form free end operating portions 88 and 89 thereon.

When the plug P is inserted into the receptacle *f*, the legs 82, 83 of the locking element *f'* will be spread apart by the cam surface 42 and snap into locking engagement with the groove 44 in the plug as soon as the plug has been moved inwardly a sufficient distance into the receptacle F. In order to remove the plug from the receptacle F, the outwardly extending free end portions 88, 89 are spread apart, as shown in FIGURE 15, to thereby separate the medial portions of the legs 82, 83 and move the same out of engagement with the locking groove 44 in the plug P so that it may be easily removed from the receptacle F.

In each of the modified forms shown, the male plug member P may be easily and quickly inserted into locking engagement with the receptacle without requiring any tools and the opposed legs of the locking element will be resiliently maintained in engagement with the locking groove in the plug P to restrict axial movement of the two elements relative to each other but permit rotational movement therebetween. In all forms, the plug P will form a fluid tight seal with the receptacle and the plug may be removed from the receptacle by spreading the medial portions of the legs of the locking element so that they move out of the locking groove in the plug.

Although the sealing O-ring has been shown in a groove on the interior portion of the receptacle, it is to be understood that the O-ring could be disposed in a groove on the plug and mate with a sealing portion on the receptacle, if desired. It is to be understood that either a hexagonal or a circular outer surface may be employed on the enlarged portion of any of the modified forms of receptacle.

In the drawings and specification, there have been set forth preferred embodiments of the invention and, although specific terms are employed, they are used in a generic and descriptive sense only and not for purposes of limitation, the scope of the invention being defined in the claims.

We claim:
1. A coupling adapted for quick connection comprising
 (a) a tubular receptacle including
  (1) a socket having means at one end for connecting one end of a fluid conducting pipe thereto and having an axial bore extending therethrough, a pair of slots extending inwardly from opposite sides thereof and into said axial bore, said socket having cam surfaces provided thereon, and
  (2) a locking element carried by said socket, said locking element including
   (A) a pair of spaced apart and similar opposed legs having medial portions normally positioned within the slots and on opposite sides of the axial bore in said socket, said medial portions being substantially straight and parallel in their normal position,
   (B) a resilient bridging portion connecting said legs together at one end and disposed externally of said socket, said bridging portion resiliently maintaining the medial portions of said opposed legs inwardly toward each other within the axial bore in said socket, and
   (C) said opposed legs having free end portions disposed externally of said socket and diametrically opposite said externally disposed bridging portion, each of said end portions having a section which extends substantially at right angles to the medial portions and substantially parallel to the longitudinal axis of the socket, (b) a tubular plug adapted to axially enter said receptacle and become releasably interlocked therewith against axial movement, said plug including
   (1) means at one end of said plug for connecting one end of a fluid conducting pipe thereto,
   (2) said plug having a free end adapted to enter the axial bore in said socket,
   (3) a circumferentially extending conical cam surface tapering outwardly and rearwardly away from the free end of said plug, said conical cam surface being engageable with the medial portions of said opposed legs of said locking element to spread said legs apart upon axial movement of said plug into said socket, and
   (4) said plug having an external circumferential groove positioned rearwardly of said conical cam surface, the medial portions of said opposed legs of said locking element being engageable with said circumferential external groove in said plug to interlock the same against axial movement when said plug is moved a predetermined distance into said socket, the externally disposed free end portions of said opposed legs being engageable with said cam surfaces of said socket to spread apart the medial portions of said legs and move the same out of the circumferential groove in said plug to release the same for axial movement out of said socket when said locking element is moved transversely of said socket, and (c) resilient fluid sealing means between said plug and said socket.

2. In a coupling according to claim 1 wherein said resilient bridging portion includes a pair of parallel portions connected at one end to corresponding ends of said opposed legs and extending longitudinally of said socket, and a connector portion interconnecting said parallel portions and extending transversely of said socket.

3. In a coupling according to claim 1 wherein the longitudinally extending sections of the free end portions of said opposed legs of said locking element include circular depressing elements, said circular depressing elements being readily engageable to move said locking element transversely of said socket.

References Cited by the Examiner

UNITED STATES PATENTS

| | | | |
|---|---|---|---|
| 1,073,850 | 9/1913 | Greer | 285—321 X |
| 1,513,710 | 10/1924 | Lewis | 285—305 X |
| 1,514,130 | 11/1924 | Clements | 285—321 X |
| 2,299,643 | 10/1942 | Moody | 285—321 X |
| 2,487,470 | 11/1949 | Osborn | 285—158 X |
| 2,805,089 | 10/1957 | Hansen | 285—321 X |
| 3,128,116 | 4/1964 | Patriquin et al. | 285—305 X |
| 3,149,362 | 9/1964 | Smithson | 285—305 X |

FOREIGN PATENTS

| | | |
|---|---|---|
| 231,768 | 2/1964 | Austria. |
| 844,214 | 4/1939 | France. |
| 745,526 | 2/1956 | Great Britain. |

CARL W. TOMLIN, *Primary Examiner.*

THOMAS F. CALLAGHAN, *Examiner.*